(12) United States Patent
Houpert et al.

(10) Patent No.: US 7,232,866 B2
(45) Date of Patent: Jun. 19, 2007

(54) ETHYLENE POLYMER COMPOSITION

(75) Inventors: Virginie Houpert, Sarralbe (FR); Fabian Siberdt, Brussels (BE); Andre Frederich, Brussels (BE)

(73) Assignee: Innovene Manufacturing Belgium NV, Antwerp (BE)

( * ) Notice: Subject to any disclaimer, the term of this patent is extended or adjusted under 35 U.S.C. 154(b) by 159 days.

(21) Appl. No.: 10/480,548

(22) PCT Filed: Jun. 10, 2002

(86) PCT No.: PCT/EP02/06370

§ 371 (c)(1),
(2), (4) Date: Dec. 12, 2003

(87) PCT Pub. No.: WO02/102891

PCT Pub. Date: Dec. 27, 2002

(65) Prior Publication Data

US 2004/0204542 A1  Oct. 14, 2004

(30) Foreign Application Priority Data

Jun. 14, 2001 (EP) ................... 01202288

(51) Int. Cl.
*C08L 23/06* (2006.01)
*C08L 23/08* (2006.01)
*C08L 23/04* (2006.01)

(52) U.S. Cl. ..................... 526/65; 526/124.2; 526/348; 525/53; 525/240

(58) Field of Classification Search .............. 526/65, 526/124.2, 348; 525/53, 240
See application file for complete search history.

(56) References Cited

U.S. PATENT DOCUMENTS

| 5,306,775 A | 4/1994 | Martin et al. ............. 525/240 |
| 6,136,924 A | 10/2000 | Promel ..................... 525/242 |
| 6,225,421 B1 * | 5/2001 | Promel et al. ............. 526/65 |

FOREIGN PATENT DOCUMENTS

| DE | 19929812 | 1/2001 |
| EP | 0897934 A | 5/2001 |
| EP | 1199161 A | 4/2002 |

* cited by examiner

*Primary Examiner*—Roberto Rabago
(74) *Attorney, Agent, or Firm*—Finnegan, Henderson, Farabow, Garrett, and Dunner, L.L.P.

(57) ABSTRACT

An ethylene polymer composition having a density of at least 950 kg/m$^3$, a fluidity index MI$_5$ of 0.05 to 2 g/10 min and a content of alpha-olefin containing from 4 to 10 carbon atoms of from 0.15 to 1 mole %, containing from 53 to 63% by weight based on the total weight of the composition of an ethylene polymer fraction (A) having a fluidity index MI$_2$ of at least 100 g/10 min a density of at least 969 kg/m$^3$ and a molecular weight distribution M$_w$/M$_n$ greater than 4, and from 37 to 47% by weight based on the total weight of the composition of a copolymer fraction (B) of ethylene and from 0.32 to 2.7 mole % of at least one alpha-olefin containing from 4 to 10 carbon atoms, a fluidity index MI$_5$ to 0.001 to 0.5 g/10 min, a density of no more than 930 kg/m$^3$ and a molecular weight distribution M$_w$/M$_n$ greater than 4, wherein the ratio of the MI$_2$ of fraction (A) to the MI$_5$ of fraction (B) is greater than 20,000.

13 Claims, No Drawings

ETHYLENE POLYMER COMPOSITION

BACKGROUND OF THE INVENTION

The present invention concerns a composition comprising an ethylene polymer and an ethylene copolymer, and its use for the manufacture of pipes. It also concerns a process of manufacture of that composition.

Patent application EP-A-0 603 935 describes a composition which comprises an ethylene polymer with high fluidity index ($MI_2$ from 5 to 1000 g/10 min) and an ethylene polymer with low fluidity index ($MI_5$ from 0.01 to 2 g/10 min) and is prepared in at least two reactors in series, the ratio by weight of these polymers being (30 to 70):(70 to 30). That patent application discloses more specifically a composition comprising an ethylene homopolymer having an $MI_2$ of 168 g/10 min and an ethylene and butene copolymer having an $MI_5$ of 0.21 g/10 min.

Patent application EP-A-0 897 934 describes a composition comprising an ethylene polymer with high fluidity index ($MI_2$ from 5 to 1000 g/10 min) and an ethylene and hexene polymer with low fluidity index ($MI_5$ from 0.01 to 2 g/10 min), the ratio by weight of these polymers being (30 to 70):(70 to 30) and the ratio of the $MI_2$ of the ethylene polymer to the $MI_5$ of the ethylene/hexene copolymer being less than 20000.

The compositions described in those patent applications present in general utilisation properties and mechanical properties which render them appropriate to be used for the manufacture of various formed objects, in particular for the manufacture of pipes for the conveying of fluids under pressure. The compositions explicitly described in those patent applications present mechanical properties, and more specifically a creep resistance, which make it possible to attribute to them a classification of MRS 8 or 10 according to standards ISO 9080 and ISO 12162. When these compositions are used for the manufacture of pipes with suitable dimensions, these pipes withstand certain pressures and certain temperatures such that extrapolation shows that the pipes have at 20° C. a resistance to circumferential stresses respectively of at least 8 and 10 MPa for at least 50 years. There is always a demand for compositions having a better creep resistance so as to be able to manufacture pipes withstanding a still greater circumferential stress while maintaining or improving the other mechanical and utilisation properties, in particular resistance to slow propagation of cracks (ESCR) and resistance to rapid propagation of cracks (RCP).

The object of the present invention is to provide ethylene polymer compositions having a better compromise between processing properties and mechanical properties than compositions obtained by known processes of the state of the art.

SUMMARY OF THE INVENTION

The invention concerns accordingly a composition having a density of at least 950 kg/m$^3$, a fluidity index $MI_5$ of 0.05 to 2 g/10 min and a content of alpha-olefin containing from 4 to 10 carbon atoms of from 0.15 to 1 mole %, comprising:
  from 53 to 63% by weight based on the total weight of the composition of an ethylene polymer fraction (A) having a fluidity index $MI_2$ of at least 100 g/10 min. a density of at least 969 kg/m$^3$ and a molecular weight distribution $M_w/M_n$ greater than 4, and
  37 to 47% by weight with based on the total weight of the composition of a copolymer fraction (B) of ethylene and from 0.32 to 9.7 mole % of at least one alpha-olefin containing from 4 to 10 carbon atoms, a fluidity index $MI_5$ of 0.001 to 0.5 g/10 min, a density of no more than 930 kg/M$^3$ and a molecular weight distribution $M_w/M_n$ greater than 4,
  wherein the ratio of the $MI_2$ of fraction (A) to the $MI_5$ of fraction (B) is greater than 20000.

DETAILED DESCRIPTION OF THE INVENTION

For the purposes of the present invention, ethylene polymer (A) is an ethylene polymer comprising monomer units derived from ethylene and possibly monomer units derived from other olefins. Copolymer (B) is a copolymer comprising monomer units derived from ethylene and monomer units derived from at least one alpha-olefin selected from olefinically unsaturated monomers having from 4 to 10 carbon atoms such as for example 1-butene, 1-hexene, 1-pentene, 3-methyl-1-butene, 3- and 4-methyl-1-pentenes and 1-octene. Preferred alpha-olefins are 1-butene, 1-hexene, 1-octene and mixtures of them. Particularly preferred are 1-butene and 1-hexene.

For the purposes of the present invention, alpha-olefin content is measured by RMN$^{13}$C according to the method described in J. C. RANDALL, JMS-REV. MACROMOL. CHEM. PHYS., C29(2&3), p. 201–317 (1989). For example the content of units derived from hexene is calculated from measurements of the integrals of the characteristic spectral lines of hexene (23.4; 34.9 and 38.1 ppm) with respect to the integral of the characteristic spectral line of the units derived from ethylene (30 ppm).

The content in copolymer (B) of monomer units derived from the one or more alpha-olefins, hereinafter called alpha-olefin content, is generally at least 0.5 mole %, in particular at least 0.8 mole %, values of at least 1 mole % being favourable. The alpha-olefin content of copolymer (B) is usually at most 1.8 mole %, preferably at most 1.7 mole %. Particularly preferred is an alpha-olefin content that does not exceed 1.5 mole %.

The alpha-olefin content of the composition is preferably at least 0.2 mole %. The alpha-olefin content of the composition preferably does not exceed 0.7 mole %.

Ethylene polymer (A) may possibly contain monomer units derived from another olefin. Ethylene polymer (A) comprises preferably at least 99.5, more particularly at least 99.8, mole % of monomer units derived from ethylene. Quite particularly preferred is an ethylene homopolymer.

For the purposes of the present invention, fluidity index $MI_2$ and $MI_5$ respectively mean the fluidity indices measured according to ASTM standard D 1238 (1986) at a temperature of 190° C. under a load of 2.16 kg and 5 kg respectively. Also, fluidity index HLMI means the fluidity index measured according to ASTM standard D 1238 (1986) at a temperature of 190° C. under a load of 21.6 kg.

Polymer (A) according to the invention preferably has an $MI_2$ of at least 200, preferably at least 250 g/10 min. The $MI_2$ of polymer (A) does not generally exceed 1000 g/10 min, preferably no more than 700 g/10 min. Polymer (A) preferably has an HLMI of at least 1000 g/10 min.

Polymer (A) preferably has an inherent viscosity $\eta_A$ (measured in tetrahydronaphthalene at 160° C., at a concentration of 1 g/1, by means of an Ostwald type viscosimeter (K2/K1 approximately 620)) of at least 0.45 dl/g, preferably at least 0.50 dl/g. Its inherent viscosity does not generally exceed 0.75 dl/g, preferably it does not exceed 0.65 dl/g.

The fluidity index $MI_5$ of copolymer (B) according to the invention is preferably at least 0.005 g/10 min. It preferably does not exceed 0.1 g/10 min. Copolymer (B) presents advantageously an HLMI of at least 0.05 g/10 min which also does not exceed 2 g/10 min.

The ratio of the $MI_2$ of fraction (A) to the $MI_5$ of fraction (B) may exceed 25000, or even 30000.

Copolymer (B) presents in general an inherent viscosity $\eta_B$ of at least 2.7 dl/g, preferably at least 3.9 dl/g. Its inherent viscosity $\eta_B$ does not exceed in general 10.9 dl/g, preferably not 7.6 dl/g.

In the compositions according to the invention, the ratio between the inherent viscosity of copolymer (B) ($\eta_B$) and that of polymer (A) ($\eta_A$) is generally at least 4, preferably at least 6. The $\eta_B/\eta_A$ ratio does not generally exceed 15, preferably not 12.

The composition according to the invention preferably has a fluidity index $MI_5$ of at least 0.07 g/10 min, preferably at least 0.1 g/10 min. The $MI_5$ of the composition does not usually exceed 1.5 g/10 min, preferably no more than 1 g/10 min. The composition according to the invention preferably has an HLMI of at least 1 g/10 min but preferably not more than 100 g/10 min.

The composition according to the invention typically has an $HLMI/MI_5$ ratio greater than 20, preferably greater than 25. The $HLMI/MI_5$ ratio does not usually exceed 150. Preferably, the $HLMI/MI_5$ ratio does not exceed 70. The $HLMI/MI_5$ ratio of the composition illustrates the broad or bimodal molecular weight distribution of the composition.

Polymer (A) and copolymer (B) utilised in the compositions according to the invention each have a molecular weight distribution characterised by a ratio $M_w/M_n$ greater than 4. The $M_w/M_n$ ratio means the ratio between the mean molecular mass by weight $M_w$ and the mean molecular mass by number $M_n$ of the polymer as they are measured by steric exclusion chromatography (SEC) according to the developing standards ISO/DIS 16014-1 and ISO/DIS 16014-2. The SEC is conducted in 1,2,4-trichlorobenzene at 135° C. and 1 ml/min on a Waters 150C chromatograph equipped with a detector by refractometry. The injections are effected on a set of four WATERS® HT-6E columns in the following conditions: injection of 400 µl of a 0.5 g/l solution of polymer and of IRGANOX® 1010, linear calibration curve based on Mark-Houwink's coefficients for polystyrenes of K=1.21E-04 and a=0.707 and for polyethylenes K=3.92E-04 and a=0.725.

Polymer (A) preferably has a molecular weight distribution $M_w/M_n$ that does not exceed 12, more particularly not 10. Copolymer (B) preferably has a molecular weight distribution $M_w/M_n$ of at least 6 but no more than 15, preferably no more than 12. It has been found that utilisation of polymers (A) and (I) having a molecular weight distribution $M_w/M_n$ greater than 4 makes it possible to obtain compositions having better homogeneity when the composition is utilised subsequently in comparison with compositions having the same composition and the same characteristics but comprising ethylene polymers having a molecular mass distribution $M_w/M_n$ below 4.

The compositions according to the invention preferably have a density measured according to ASTM standard D 792 (on a sample prepared according to ASTM standard D 1928 Procedure C) of at least 952 kg/m³, more particularly at least 954 kg/m³. Preferably the density does not exceed 960 kg/m³. Particularly preferred are compositions whose density is below 958 kg/m². The density of the polymer (A) present in the compositions according to the invention is preferably at least 972 kg/m³. The density of copolymer (B) is preferably at least 910 kg/m³. The density of copolymer (B) does not exceed preferably 928 kg/m³ more particularly not 926 kg/m³.

The quantity of polymer (A) in the composition of the invention is preferably at least 55%, more preferably at least 57% by weight with respect to the total weight of the composition. The quantity of polymer (A) preferably does not exceed 62% by weight.

The quantity of copolymer (B) is preferably at least 38%. The quantity of copolymer (B) preferably does not exceed 45% by weight. Good results have been obtained with a quantity of copolymer (B) not exceeding 43% by weight with respect to the total weight of the composition.

The composition according to the invention comprises generally at least 95%, preferably at least 99% by weight of the combination of polymer (A) and of copolymer (B). Particularly preferred is a composition consisting of polymer (A) and of copolymer (B) only.

The composition of the invention preferably comprises an intimate and homogeneous mixture of polymer (A) and of copolymer (B), copolymer (B) being prepared in the presence of polymer (A) or vice versa. Thus the composition comprises particles comprising both polymer (A) and copolymer (B).

The compositions of the invention are preferably obtained by means of a manufacturing process, in at least two polymerisation reactors connected in series, according to which process:

in a first reactor, ethylene is polymerised in suspension in a medium comprising a diluent, oxygen, a catalyst based on a transition metal and a cocatalyst so as to form from 53 to 63% by weight with respect to the total weight of the composition of ethylene polymer (A), said medium comprising polymer (A) in addition is drawn off from said reactor and is subjected to expansion so as to degas at least part of the hydrogen, after which said at least partially degassed medium comprising polymer (A) and some ethylene and at least another alpha-olefin containing from 4 to 10 carbon atoms are introduced into a further reactor in which polymerisation in suspension is effected in order to form from 37 to 47% by weight with respect to the total weight of the composition of ethylene copolymer (B).

Polymerisation in suspension means polymerisation in a diluent which is in the liquid state in the polymerisation conditions (temperature, pressure) used, these polymerisation conditions or the diluent being such that at least 50% by weight (preferably at least 70%) of the polymer formed is insoluble in said diluent.

The diluent used in this polymerisation process is usually a hydrocarbon diluent, inert to the catalyst, to the cocatalyst and to the polymer formed, such for example as a linear or branched alkane or a cycloalkane, having from 3 to 8 carbon atoms, such as hexane or isobutane.

The quantity of hydrogen introduced into the first reactor is in general set so as to obtain, in the diluent, a molar ratio between hydrogen and ethylene of 0.05 to 1. In the first reactor, this molar ratio is preferably at least 0.1. Particularly preferred is a hydrogen/ethylene molar ratio that does not exceed 0.6.

The medium drawn off from the first reactor comprising in addition the polymer (A) is subjected to expansion so as to eliminate (degas) at least part of the hydrogen. The expansion is advantageously effected at a temperature below or equal to the polymerisation temperature in the first reactor. The temperature at which the expansion is effected is usually greater than 20° C., it is preferably at least 40° C.

The pressure at which the expansion is carried out is below the pressure in the first reactor. The expansion pressure is preferably below 1.5 MPa. The expansion pressure is usually at least 0.1 MPa. The quantity of hydrogen still present in the at least partially degassed medium is generally below 1% by weight of the quantity of hydrogen initially present in the medium drawn off from the first polymerisation reactor, this quantity is preferably below 0.5%. The quantity of hydrogen present in the partially degassed medium introduced into the further polymerisation reactor is therefore low or even nil. The further reactor is preferably also supplied with hydrogen. The quantity of hydrogen introduced into the further reactor is in general set so as to obtain, in the diluent a molar ratio between hydrogen and ethylene of 0.001 to 0.1. In this further reactor, this molar ratio is preferably at least 0.004. It does not exceed preferably 0.05. In the process according to the invention, the ratio between the hydrogen concentration in the diluent in the first reactor and that in the further polymerisation reactor is usually at least 20, preferably at least 30. Particularly preferred is a ratio of concentrations of at least 40. This ratio does not usually exceed 300, preferably not 200.

The quantity of alpha-olefin introduced into the further polymerisation reactor is such that in that reactor the alpha-olefin/ethylene molar ratio in the diluent is at least 0.05, preferably at least 0.1. The quantity of alpha-olefin introduced into the further reactor is such that the alpha-olefin/ethylene molar ratio does not exceed 3, preferably not 2.8.

The catalyst used in this process comprises, at least one transition metal. Transition metal means a metal of groups 4, 5 or 6 of the Periodic Table of elements (CRC Handbook of Chemistry and Physics, 75th edition, 1994–95). The transition metal is preferably titanium and/or zirconium. A catalyst comprising not only the transition metal but also magnesium is preferably utilised. Good results have been obtained with catalysts comprising:

from 10 to 30%, preferably from 15 to 20%, by weight of transition metal,
from 0.5 to 20%, preferably from 0.1 to 10%, by weight of magnesium,
from 20 to 60%, preferably from 30 to 50%, by weight of halogen, such as, chlorine,
from 0.1 to 10%, preferably from 0.5 to 5%, by weight of aluminium;

the balance generally consisting of elements arising from products used for their manufacture, such as carbon, hydrogen and oxygen. These catalysts are preferably obtained by coprecipitation of at least one transition metal composition and a magnesium composition by means of a halogenated organoaluminium composition. Such catalysts are known, they have notably been described in patents U.S. Pat. No. 3,901,863, U.S. Pat. No. 4,292,200 and U.S. Pat. No. 4,617,360. The catalyst is preferably introduced only into the first polymerisation reactor, i.e. there is no introduction of fresh catalyst into the further polymerisation reactor.

The cocatalyst utilised in the process is preferably an organoaluminium compound. Unhalogenated organoaluminium compounds of formula $AlR_3$ in which R represents an alkyl grouping having from 1 to 8 carbon atoms are preferred. Particularly preferred are triethylaluminium and triisobutylaluminium. The cocatalyst is introduced into the first polymerisation reactor. Fresh cocatalyst may also be introduced into the further reactor. The quantity of cocatalyst introduced into the first reactor is in general at least $0.1 \times 10^{-3}$ mole per liter of diluent. It does not usually exceed $5 \times 10^{-3}$ mole per liter of diluent. Any quantity of fresh cocatalyst introduced into the further reactor does not usually exceed $5 \times 10^{-3}$ mole per liter of diluent.

The polymerisation temperature is generally from 20 to 130° C. It is preferably at least 60° C. For preference, it does not exceed 115° C. The total pressure at which the process is effected is in general from 0.1 MPa to 10 MPa. In the first polymerisation reactor, the total pressure is preferably at least 2.5 MPa. Preferably, it does not exceed 5 MPa. In the further polymerisation reactor, the total pressure is preferably at least 1.3 MPa. Preferably, it does not exceed 4.3 MPa.

The period of polymerisation in the first reactor and in the further reactor is in general at least 20 minutes, preferably at least 30 minutes. It does not usually exceed 5 hours, preferably not 3 hours.

In this process, a suspension comprising a composition having from 53 to 63% by weight of polymer (A) and from 37 to 47% by weight of copolymer (B) is collected at the outlet of the further polymerisation reactor. The composition may be separated from the suspension by any known means. Usually, the suspension is subjected to a pressure expansion (final expansion) so as to eliminate the diluent, the ethylene, the alpha-olefin and any hydrogen from the composition.

This process makes it possible to obtain, with a good yield and with a low oligomers content, a composition having a very good compromise between mechanical properties and utilisation properties.

The compositions of the invention are well suited to the manufacture of pipes, particularly pipes for the conveying of fluids under pressure, such as water and gas. The invention therefore also concerns the use of a composition according to the invention for the manufacture of pipes. Naturally, when they are used for the molten forming of articles, and more particularly for the manufacture of pipes, the compositions of the invention may be mixed with the usual additives for utilisation of polyolefins, such as stabilisers (antioxidant agents, anti-acids and/or anti-UVs), antistatic agents and utilisation agents ("processing aid"), and pigments. The invention therefore concerns also a mixture comprising a composition according to the invention and at least one of the additives described above. Particularly preferred are mixtures comprising at least 95%, preferably at least 97%, by weight of a composition according to the invention and at least one of the additives described above. The manufacture of pipes by extrusion of a composition according to the invention is preferably carried out on an extrusion line comprising an extruder, a sizer and a drawing device. Extrusion is generally performed on an extruder of the single-screw type and at a temperature of 150 to 230° C. The sizing of the pipes may be effected by: the creation of negative pressure outside the pipe and/or by the creation of positive pressure inside the pipe.

Pipes manufactured by means of the compositions according to the invention are characterised by:

good resistance to slow propagation of cracks (FNCT), reflected by a rupture time, as measured by the method described in the standard undergoing preparation ISO/DIS 16770.2 (2001) (at 80° C., under a stress of 5.0 MPa (in an Arkopal N110 2% solution)), generally greater than 100 hours;

good resistance to rapid propagation of cracks (RCP), reflected by a halting of crack propagation at an internal pressure generally equal to at least 10 bar, as measured at 0° C. on a pipe of diameter 110 mm and thickness 110 mm according to method S4 described in ISO standard F/DIS 13477(1996);

good long-term pressure resistance which enables them to be attributed a higher MRS rating than the MRS 10 rating according to standard ISO/TR 9080. Typically, the pipes manufactured from a composition of the invention have a pressure resistance that enables them to be attributed an MRS rating of 11.2 or even 12.5 according to standard ISO/TR 9080.

Pipes manufactured from the compositions of the invention are characterised in particular by a better compromise between resistance to propagation of cracks (slow propagation and rapid propagation of cracks) and creep resistance than compositions known from the prior art. The invention therefore also concerns pipes (more particularly pipes for the conveying of fluids under pressure) obtained by extrusion of a composition according to the invention.

The following examples are intended to illustrate the invention.

The meaning of the symbols used in these examples and the units expressing the parameters mentioned and the methods of measuring those parameters are explained below.

Q=comonomer content of copolymer (B), expressed in mole %, measured as described above.

QT=comonomer content of the composition, expressed in mole %. This content is measured as explained above for the comonomer content of copolymer (B)

The other symbols are explained in the description.

The values marked * were calculated from measured values for the polymer manufactured in reactor 1 and the composition leaving reactor 2.

EXAMPLE 1 a) Preparation of the Catalyst

Magnesium diethylate was caused to react for 4 hours at 150° C. with titanium tetrabutylate in quantities such that the molar ratio of titanium to magnesium was equal to 2. Thereafter the reaction product thus obtained was chlorinated and precipitated by placing it in contact with an ethylaluminium dichloride solution for 90 minutes at 45° C. The catalyst thus obtained, gathered from the suspension, comprised (% by weight):

Ti: 17; Cl: 41; Al: 2; Mg: 5.

b) Preparation of Polymer (A)

Hexane, ethylene, hydrogen, triethylaluminium and the catalyst described in item a) were introduced into a polymerisation reactor and the ethylene was polymerised at 90° C. for 1 h 33 min. The hydrogen/ethylene molar ratio in the reactor was 0.4.

The characteristics of the polymer obtained are presented in Table 1.

c) Preparation of Copolymer (B)

Isobutane, ethylene, hydrogen, 1-butene, triethylaluminium and the catalyst described in item a) were introduced into a polymerisation reactor and the ethylene was polymerised at 75° C. for 55 min. The hydrogen/ethylene and 1-butene/ethylene molar ratio were respectively 0.000 and 1.009.

The characteristics of the polymer obtained are presented in Table 1.

d) Preparation of the Composition Comprising Polymer (A) and Copolymer (B)

600 g of polymer (A) as described in item b) was mixed in an extruder with 400 g of copolymer (B) as described in item c). The mixture thus obtained was granulated and its characteristics were measured. They are reproduced in Table 1.

EXAMPLES 2 to 4

Compositions comprising different quantities or copolymers different from the copolymer (B) described in example 1 c) were manufactured.

The characteristics and properties of these compositions are presented in Table 1.

EXAMPLES 5R TO 9R (COMPARATIVE)

Compositions not conforming to the invention comprising different quantities or copolymers different from the copolymer (B) described in example 1 c) were manufactured. The characteristics and the properties of these compositions are presented in Table 1.

TABLE 1

| | Polymer (A) | | | | Copolymer (B) | | | | | | Composition | | | |
|---|---|---|---|---|---|---|---|---|---|---|---|---|---|---|
| Ex | % wt | MI$_2$ | MVS | M$_w$/M$_n$ | % wt | HLMI | MVS | α-olefin | Q | M$_w$/M$_n$ | MI$_5$ | HLMI/MI$_5$ | MVS | QT | FNCT |
| 1 | 60 | 502 | 972.8 | 4.2 | 40 | 0.080 | 921.9 | 1-butene | 1.28 | 8.3 | 0.57 | 47 | 954.4 | 0.5 | 941.8 |
| 2 | 55 | 502 | 972.8 | 4.2 | 45 | 0.17 | 929.3 | 1-hexene | 0.54 | 6.1 | 0.4 | 32 | 956.7 | 0.24 | 101.6 |
| 3 | 60 | 502 | 972.8 | 4.2 | 40 | 0.09 | 925.0 | 1-butene | 0.84 | 7.5 | 0.43 | 43 | 956.7 | 0.38 | 192.9 |
| 4 | 60 | 502 | 972.8 | 4.2 | 40 | 0.080 | 926.0 | 1-hexene | 9.70 | 6.4 | 0.39 | 41 | 957.1 | 0.28 | 427.2 |
| 5R | 49 | 502 | 972.8 | 4.2 | 51 | 0.22 | 927.6 | 1-butene | 0.72 | 4.7 | 0.31 | 28 | 952.8 | 0.36 | 79.1 |
| 6R | 49 | 502 | 972.8 | 4.2 | 51 | 0.28 | 932.3 | 1-butene | 0.43 | 4.3 | 0.41 | 25 | 955.5 | 0.22 | 15.2 |
| 7R | 49 | 502 | 972.8 | 4.2 | 51 | 0.22 | 933.3 | 1-hexene | 0.28 | 4.4 | 0.32 | 26 | 956.5 | 0.14 | 24.2 |
| 8R | 49 | 502 | 972.8 | 4.2 | 51 | 0.19 | 932.5 | 1-octene | 0.43 | 4.4 | 0.31 | 24 | 956 | 0.22 | 19.6 |
| 9R | 55 | 502 | 972.8 | 4.2 | 45 | 0.11 | 931.6 | 1-butene | 0.32 | 5.6 | 0.23 | 39 | 958.5 | 0.14 | 25.7 |

EXAMPLE 10

An ethylene polymer composition in suspension in isobutane was manufactured in two loop reactors connected in series, separated by a device making it possible to effect pressure expansion continuously.

The catalyst as described in item a) of Example 1 was introduced continuously into the first loop reactor, and polymerisation of the ethylene to form polymer (A) was effected in this medium. Said medium comprising polymer (A) in addition was drawn off continuously from said reactor and was subjected to expansion (48° C., 0.6 MPa) so as to eliminate at least part of the hydrogen. The resulting medium at least partially degassed from hydrogen was then introduced continuously into a second polymerisation reactor at the same time as ethylene, hexene, isobutane and hydrogen, and polymerisation of the ethylene and the hexene was effected in order to form the copolymer (B). The suspension comprising the polymer composition was drawn off continuously from the second reactor and this suspension was subjected to a final expansion so as to evaporate the isobutane and the reagents present (ethylene, hexene and hydrogen) and recover the composition in the form of a powder that was subjected to drying in order to finish the degassing of the isobutane. The other polymerisation conditions are specified in Table 2.

The properties of the final composition are presented in Table 3.

973 parts of the composition obtained were mixed with 22.5 parts of carbon black, 3.5 parts of an antioxidant agent and 1 pair of an anti-acid agent. This mixture was granulated by extrusion in an extruder at a temperature of about 260° C.

Thereafter pipes were manufactured by extrusion of these granules on an extruder of single-screw type at 200° C. The properties measured on these pipes are reproduced in Table 3.

EXAMPLE 11R (COMPARATIVE)

Example 10 was repeated but adapting the polymerisation conditions (see Table 2) in order to obtain the other composition as described in Table 3.

It can be seen that the composition of the invention Example 10) has a better compromise between resistance to propagation of cracks (resistance to slow propagation of cracks and resistance to rapid propagation of cracks) and long term pressure resistance than the composition not conforming to the invention (Example 11R).

TABLE 2

| | EXAMPLE | |
|---|---|---|
| | 10 | 11R |
| REACTOR 1 | | |
| C2 (g/kg diluent) | 12 | 7.4 |
| H2/C2 (% mol) | 55.7 | 57.7 |
| T (° C.) | 90 | 90 |
| dwell time (h) | 1.4 | 1.4 |
| REACTOR 2 | | |
| C2 (g/kg diluent) | 28.9 | 25.7 |
| 1-hexene/C2 % mol | 116 | 73 |
| H2/C2 (% mol) | 0.31 | 0.31 |
| T (° C.) | 77 | 77 |
| dwell time (h) | 1.12 | 1.13 |

TABLE 3

| | EXAMPLE | |
|---|---|---|
| | 10 | 11R |
| Polymer manufactured in reactor 1 | homo | Homo |
| weight (%) | 58.4 | 51.7 |
| MI$_2$ (g/10 min) | 571 | 416 |
| MVS (kg/m$^3$) | 973.3 | 973.4 |
| Polymer manufactured in reactor 2 | copo C2–C6 | copo C2–C6 |
| weight (%) | 41.6 | 48.3 |
| MI$_5$ *(g/10 min) | 0.018 | 0.021 |
| MVS *(kg/m$^3$) | 924.3 | 926.0 |

TABLE 3-continued

| | EXAMPLE | |
|---|---|---|
| | 10 | 11R |
| Q *(% molar) Composition leaving reactor 2 | 0.72 | 0.66 |
| QT (% molar) | 0.30 | 0.32 |
| MI$_5$ (g/10 min) | 0.54 | 0.35 |
| MVS (kg/m$^3$) | 955.3 | 952.9 |
| FNCT (h) [80° C., stress 5.0 MPa] | >260 | 250 |
| MRS estimation (MPa) [20° C., 50 years] | 11.3 | <10.8 |

The invention claimed is:

1. An ethylene polymer composition comprising a mixture of from 53 to 63% by weight based on the total weight of the composition of an ethylene polymer fraction (A) having a fluidity index MI$_2$ of at least 100 g/10 min, a density of at least 969 kg/m$^3$ and a molecular weight distribution M$_w$/M$_n$ greater than 4, and from 37 to 47% by weight based on the total weight of the composition of a copolymer fraction (B) of ethylene and from 0.32 to 2.7 mole % of at least one alpha-olefin containing from 4 to 10 carbon atoms, said copolymer fraction (B) having a fluidity index MI$_5$ of 0.001 to 0.5 g/10 mm, a density of no more than 930 kg/m$^3$ and a molecular weight distribution M$_w$/M$_n$ greater than 4, wherein the ratio of the MI$_2$ of polymer fraction (A) to the MI$_5$ of copolymer fraction (B) is greater than 30,000, said ethylene polymer composition having a density of at least 950 kg/m$^3$, a fluidity index MI$_5$ of 0.05 to 2 g/10 min and a content of alpha-olefin containing from 4 to 10 carbon atoms, which are copolymerized with ethylene in copolymer fraction (B), of from 0.15 to 1 mole %.

2. The ethylene polymer composition according to claim 1, having a density between 952 kg/m$^3$ and 960 kg/m$^3$.

3. The ethylene polymer composition according to claim 1, wherein the ethylene polymer composition has a fluidity index MI$_5$ of at least 0.1 and not exceeding 1 g/10 mm.

4. The ethylene polymer composition according to any one of claims 1 to 3, having at least 55% by weight with respect to the total weight of the composition of the ethylene polymer fraction (A).

5. The ethylene polymer composition according to claim 4, having 57–62% by weight with respect to the total weight of the composition of the ethylene polymer fraction (A), and 38–43% by weight with respect to the total weight of the composition of the copolymer fraction (B).

6. The ethylene polymer composition according to claim 1, having a content of at least 0.2% mole % and at most 0.7 mole % of alpha-olefin containing from 4 to 10 carbon atoms.

7. The ethylene polymer composition according to claim 1, wherein the at least one alpha-olefin in copolymer fraction B is 1-butene and/or 1-hexene.

8. The ethylene polymer composition according to claim 1, which has an FNCT, reflected by a rupture time as measured by the method described in the standard undergoing preparation ISO/DIS 16770.2 (2001) ((at 80° C., under a stress of 5.0 MPa (in an Arkopal N110 2% solution)), of greater than 100 hours.

9. The ethylene polymer composition according to claim 1, which has an MRS rating of 11.2 or more according to standard ISO/TR 9080.

10. A process for making an ethylene polymer composition as defined in claim 1, in at least two polymerization reactors connected in series, the process comprising performing the following steps: in a first reactor, polymerizing ethylene in suspension in a medium comprising a diluent, hydrogen, a catalyst based on a transition metal and a cocatalyst so as to form 53 to 63% by weight with respect to the total weight of the composition of the ethylene polymer fraction (A), drawing off said medium containing in addition the polymer fraction (A) from said reactor and subjecting said drawn off medium to expansion so as to degas at least part of the hydrogen, and after which introducing into a further reactor and polymerizing in suspension therein said at least partially degassed medium containing polymer fraction (A) and some ethylene and at least one other a-olefin containing from 4 to 10 carbon atoms to form from 37 to 47% by weight with respect to the total weight of the composition of the copolymer fraction (B).

11. The process according to claim 10, wherein the catalyst utilized comprises from 10 to 30% by weight of transition metal, from 0.5 to 20% by weight of magnesium, from 20 to 60% by weight of a halogen and from 0.1 to 10% by weight of aluminium.

12. A process for the manufacture of pipes, comprising extruding an ethylene polymer composition according to claim 1.

13. A process for the manufacture of pipes, comprising extruding an ethylene polymer composition formed by a process as defined in claim 10.

\* \* \* \* \*